United States Patent
Vogel et al.

(10) Patent No.: US 8,078,374 B2
(45) Date of Patent: Dec. 13, 2011

(54) CONTROL SYSTEM FOR AN AT LEAST TEMPORARILY FOUR-WHEEL-DRIVEN MOTOR VEHICLE

(75) Inventors: Thomas-Dieter Vogel, Augsburg (DE); Gerd Egger, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1159 days.

(21) Appl. No.: 11/837,198

(22) Filed: Aug. 10, 2007

(65) Prior Publication Data
US 2008/0040011 A1    Feb. 14, 2008

(30) Foreign Application Priority Data
Aug. 12, 2006  (DE) .................. 10 2006 037 818

(51) Int. Cl.
*B60T 8/176*   (2006.01)

(52) U.S. Cl. ............... 701/69; 701/70; 701/74; 701/89; 701/90

(58) Field of Classification Search .............. 701/67–74, 701/82, 87–91; 180/197, 244–250, 233; 188/2 A; 477/476, 176
See application file for complete search history.

(56) References Cited

U.S. PATENT DOCUMENTS

| | | | | |
|---|---|---|---|---|
| 4,986,388 A | * | 1/1991 | Matsuda | 180/248 |
| 5,471,390 A | * | 11/1995 | Sasaki | 701/78 |
| 5,701,247 A | * | 12/1997 | Sasaki | 701/1 |
| 5,924,510 A | * | 7/1999 | Itoh et al. | 180/197 |
| 7,197,386 B2 | | 3/2007 | Billig et al. | |
| 2006/0113135 A1 | * | 6/2006 | Billig et al. | 180/233 |

FOREIGN PATENT DOCUMENTS

| | | |
|---|---|---|
| DE | 40 11 272 C2 | 10/1990 |
| DE | 197 24 490 A1 | 12/1997 |
| DE | 100 54 023 A1 | 5/2002 |
| DE | 103 33 650 A1 | 2/2005 |

OTHER PUBLICATIONS

German Search Report dated Jun. 20, 2007 with English translation of relevant portion (Nine (9) pages).

* cited by examiner

*Primary Examiner* — Khoi Tran
*Assistant Examiner* — Spencer Patton
(74) *Attorney, Agent, or Firm* — Crowell & Moring LLP

(57) ABSTRACT

In the case of a control system for an at least temporarily four-wheel-driven motor vehicle having an electronic control unit, which determines at least the rotational speeds of all wheels and the vehicle speed, and by which the driving torque of a drive unit can be distributed in a variable manner by way of a controllable transfer clutch to primary driving wheels, which are permanently connected with the drive unit, and to secondary driving wheels which, can be connected with the drive unit as required, the control unit closes the transfer clutch when the slip of a rear wheel exceeds the slip of the front wheel of the same vehicle side by a value which is greater than a given first threshold and when, preferably, also the longitudinal deceleration of the vehicle exceeds a given second threshold or the lateral acceleration of the vehicle exceeds a given third threshold.

12 Claims, 2 Drawing Sheets

CONTROL SYSTEM FOR AN AT LEAST TEMPORARILY FOUR-WHEEL-DRIVEN MOTOR VEHICLE

BACKGROUND AND SUMMARY OF THE INVENTION

This application claims the priority of German Application No. 10 2006 037 818.0, filed Aug. 12, 2006, the disclosure of which is expressly incorporated by reference herein.

The invention relates to a control system for an at least temporarily four-wheel-driven motor vehicle.

A control system of this type is described, for example, in German Patent document DE 100 54 023 A1. A torque distribution device is, therefore, known for changing the torque distribution ratio between the wheels of the front axle and the wheels of the rear axle by a corresponding control of a friction clutch as a longitudinal lock (transfer clutch). By defining a torque distribution ratio, the handling of a vehicle can be influenced considerably. The object of German Patent document DE 100 54 023 A1 relates particularly to the cornering dynamics. In this case, a temporarily four-wheel-driven motor vehicle may, for example, be a basically front-wheel-driven motor vehicle with a rear-wheel drive that can be connected by way of a transfer clutch, or a basically rear-wheel-driven motor vehicle with a front-wheel drive that can be connected by way of a transfer clutch.

In the following, in a generalized manner, the wheels permanently connected with the drive unit will be called primary driving wheels, and the wheels which, by way of a transfer clutch can be connected with the drive unit, as required, will be called secondary driving wheels.

Furthermore, such known control systems usually have a control of the transfer clutch as a function of the rotational speed difference between a rotational speed of the primary driving axle and the rotational speed of the secondary driving axle, or between the two rotational wheel speeds of the wheels of at least one vehicle side (for example, see German Patent document DE 103 33 650 A1).

The invention seeks to improve upon a control system of the above-mentioned type with respect to an optimized interaction between the longitudinal lock control and the brake slip control.

According to the present invention, a control system is provided for an at least temporarily four-wheel-driven motor vehicle having an electronic control unit, which determines at least the rotational speeds of all wheels and the vehicle speed and, by which the driving torque of a drive unit can be distributed in a variable manner by way of a controllable transfer clutch to primary driving wheels, which are permanently connected with the drive unit, and to secondary driving wheels which can be connected with the drive unit as required. The control unit is operably configured to close the transfer clutch when the slip of a rear wheel exceeds the slip of the front wheel of the same vehicle side by a value which is greater than a given first threshold. Advantageous further developments of the invention are described herein.

Further advantageously according to the invention, in the case of a control system for an at least temporarily four-wheel-driven motor vehicle having an electronic control unit, which determines at least the rotational speeds of all wheels and the vehicle speed and, by which the driving torque of a drive unit can be distributed in a variable manner by way of a controllable transfer clutch to primary driving wheels, which are permanently connected with the drive unit, and to secondary driving wheels which can be connected with the drive unit as required, the transfer clutch is closed by the control unit when the slip of a rear wheel exceeds the slip of the front wheel of the same vehicle side by a value which is greater than a given first threshold and when preferably also the longitudinal deceleration of the vehicle exceeds a given second threshold or the lateral acceleration of the vehicle exceeds a given third threshold.

The present invention recognizes that motor vehicles are equipped with an electronically controlled all-wheel drive as well as with an electronically controlled brake adjusting system. Furthermore, it is known that the electronic control unit for controlling the brake system contains the control of the transfer clutch of an electronically controlled all-wheel drive. However, so far, control strategies for the brake adjusting systems in the partial braking range, that is, during a braking operation outside the antilock control range, have been carried out largely uncoupled from the control strategies for all-wheel drives. This may result in audible adjusting interventions in the event of a brake slip at the rear axle which is relatively high in comparison with the front axle. The present invention therefore provides driving stability by a complete closing of the transfer clutch in the partial braking range when a brake slip occurs at the rear axle which is relatively high in comparison to the front axle. However, the transfer clutch is preferably closed only when no low coefficient of friction is present. According to the invention, a low coefficient of friction is detected when the longitudinal vehicle acceleration is too low in comparison with the applied brake pressure.

Thus, the present invention particularly improves the acoustics of a brake adjusting system while simultaneously maintaining the driving stability.

Other objects, advantages and novel features of the present invention will become apparent from the following detailed description of the invention when considered in conjunction with the accompanying drawings.

DETAILED DESCRIPTION OF THE DRAWINGS

Figure 1:
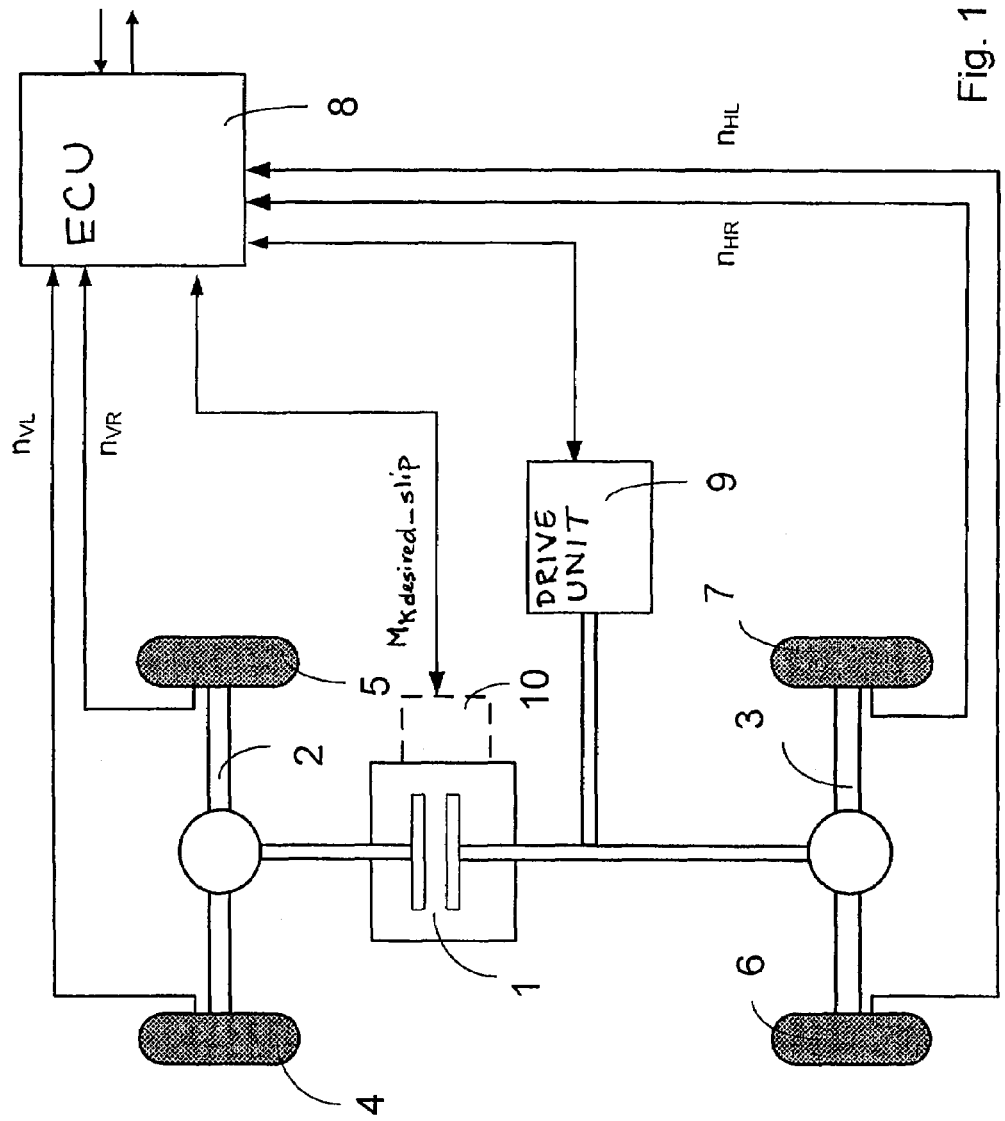
FIG. 1 is a schematic view of a temporarily four-wheel-driven vehicle having a transfer clutch, which is adjustable by way of a control unit, using the example of a basically rear-wheel-driven motor vehicle with a front-wheel drive which can be connected by way of a transfer clutch.

FIG. 1 illustrates a temporarily four-wheel-driven vehicle in the form of a basically rear-wheel-driven motor vehicle with a front wheel drive, which can be connected by way of a transfer clutch 1 as required. The transfer clutch 1 can be adjusted by way of an electronic control unit 8. The control unit 8 may contain an externally stored supplementary control device 10 which converts, for example, the given desired clutch torque to a current for triggering the adjusting unit of the transfer clutch 1.

In the case of a vehicle according to FIG. 1, while the transfer clutch 1 is open, the entire torque (drive torque) of the drive unit 9 preferably consisting of an internal-combustion engine, a transmission, and at least one drive control device, is transferred to the wheels 6 and 7 of the rear axle 3. Here, the rear wheels 6 and 7 are the primary driving wheels because they are permanently connected with the drive unit 9. As the clutch torque at the transfer clutch 1 increases, the drive unit 9 will also drive the wheels 4 and 5 of the front axle 2. Thus, the front wheels 4 and 5 are the secondary driving wheels.

Figure 2:
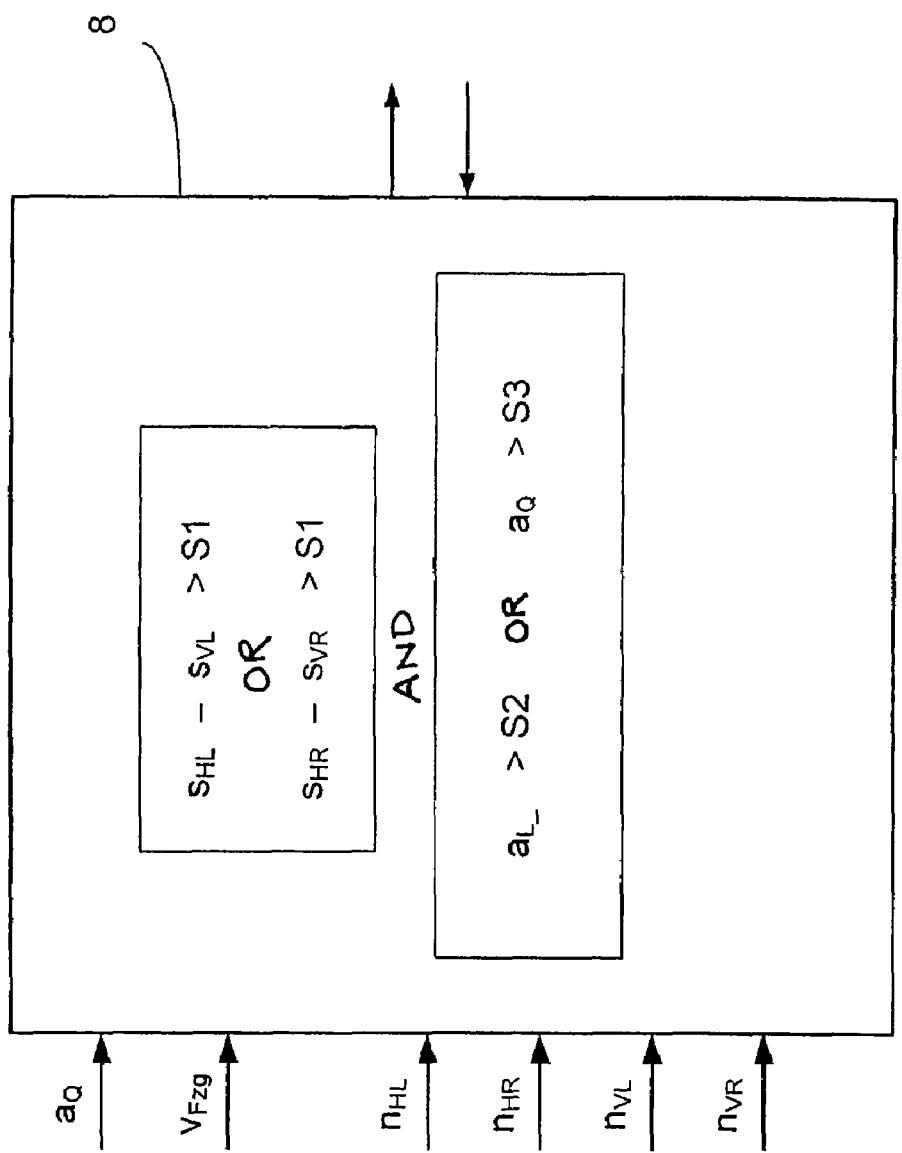
FIG. 2 is a schematic view of an exemplary algorithm contained in the control unit for implementing the method according to the invention.

In addition to further input signals, the control unit 8 detects, in particular, the rotational wheel speeds $n_{VL}$, $n_{HL}$, $n_{VR}$, $n_{HR}$ of all wheels 4, 5, 6, 7, the lateral vehicle acceleration $a_Q$ and the vehicle speed $v_{Fzg}$ (see also, FIG. 2). As an alternative, the lateral vehicle acceleration $a_Q$ and the vehicle speed $v_{Fzg}$ may also be calculated in the control unit 8.

FIG. 2 is a schematic view of additional details of the control unit 8 required for implementing the invention.

For the distribution of the driving torque of the drive unit 9, a clutch torque $M_{Kdesired\_slip}$ to be adjusted is defined for the transfer clutch 1 arranged between the drive unit 9 or the primary driving wheels 6 and 7 and the secondary driving wheels 4 and 5. According to the invention, the clutch torque $M_{Kdesired\_slip}$ is increased such that the transfer clutch 1 is completely closed when the slip $s_{HL}$ or $s_{HR}$ of a rear wheel 6 or 7 exceeds the slip $s_{VL}$ or $s_{VR}$ of the front wheel 4 or 5 of the respectively same vehicle side by a value that is greater than a defined first threshold S1, and when simultaneously also the longitudinal vehicle deceleration $a_{L\_}$, which can be calculated, for example, from the vehicle speed $v_{Fzg}$, exceeds a defined second threshold S2, and/or the lateral vehicle acceleration $a_Q$ exceeds a defined third threshold S3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for an at least temporarily four-wheel-driven motor vehicle, the control system comprising:
   an electronic control unit, which determines at least rotational speeds of all wheels of the motor vehicle and a vehicle speed of the motor vehicle, the electronic control unit distributing a drive torque of a drive unit of the motor vehicle in a variable manner via a controllable transfer clutch to primary driving wheels permanently connected with the drive unit and to secondary driving wheels optionally connected with the drive unit; and
   wherein the control unit is operably configured to close a transfer clutch when a slip of a rear wheel exceeds a slip of a front wheel of the same vehicle side by a value greater than a given first threshold, and when, in addition, a lateral vehicle acceleration exceeds a given second threshold.

2. A control system for an at least temporarily four-wheel-driven motor vehicle, the control system comprising:
   an electronic control unit, which determines at least rotational speeds of all wheels of the motor vehicle and a vehicle speed of the motor vehicle, the electronic control unit distributing a drive torque of a drive unit of the motor vehicle in a variable manner via a controllable transfer clutch to primary driving wheels permanently connected with the drive unit and to secondary driving wheels optionally connected with the drive unit; and
   wherein the control unit is operably configured to close a transfer clutch when both (i) a slip of a rear wheel exceeds a slip of a front wheel of the same vehicle side by a value greater than a given first threshold, and (ii) a longitudinal vehicle deceleration exceeds a given second threshold.

3. The control system according to claim 2, wherein the control unit is operably configured to close the transfer clutch only when, in addition, a lateral vehicle acceleration exceeds a given third threshold.

4. The control system according to claim 2, wherein the control unit is further operably configured to close the transfer clutch during a braking operation outside an antilock control range.

5. A motor vehicle, comprising:
   a drive unit;
   an electronic control unit which determines at least rotational speeds of all wheels of the motor vehicle and a vehicle speed;
   a controllable transfer clutch operably coupled with the electronic control unit, wherein a drive torque of the drive unit is distributable in a variable manner via the controllable transfer clutch to primary driving wheels permanently connected with the drive unit and to secondary driving wheels optionally connected with the drive unit such that the motor vehicle is an at least temporarily four-wheel-driven motor vehicle; and
   wherein the control unit is operably configured to close the controllable transfer clutch when a slip of a rear wheel exceeds a slip of a front wheel of the same vehicle side by a value greater than a given first threshold, and when, in addition, a lateral vehicle acceleration exceeds a given second threshold.

6. A motor vehicle, comprising:
   a drive unit;
   an electronic control unit which determines at least rotational speeds of all wheels of the motor vehicle and a vehicle speed;
   a controllable transfer clutch operably coupled with the electronic control unit, wherein a drive torque of the drive unit is distributable in a variable manner via the controllable transfer clutch to primary driving wheels permanently connected with the drive unit and to secondary driving wheels optionally connected with the drive unit such that the motor vehicle is an at least temporarily four-wheel-driven motor vehicle; and
   wherein the control unit is operably configured to close the controllable transfer clutch when both (i) a slip of a rear wheel exceeds a slip of a front wheel of the same vehicle side by a value greater than a given first threshold, and (ii) a longitudinal vehicle deceleration exceeds a given second threshold.

7. The motor vehicle according to claim 6, wherein the control unit closes the transfer clutch when, in addition, a lateral vehicle acceleration exceeds a given third threshold.

8. The motor vehicle according to claim 6, wherein the control unit closes the transfer clutch during a braking operation outside an antilock control range.

9. A method of controlling a transfer clutch of an at least temporarily four-wheel-driven motor vehicle in which the transfer clutch is utilized to distribute a drive torque between primary drive wheels permanently connected with a drive unit of the motor vehicle and to secondary drive wheels optionally connected with the drive unit of the motor vehicle as required, the method comprising the acts of:
   determining a rear wheel slip of the rear wheels of the vehicle;
   determining a front wheel slip of the front wheels of the vehicle;
   determining whether a rear wheel slip of a rear wheel exceeds a front wheel slip of a front wheel on the same side of the vehicle by a value greater than a defined first threshold value; and
   closing the transfer clutch when the rear wheel slip of the rear wheel exceeds the front wheel slip of the front wheel on the same side of the vehicle by the value greater than the defined first threshold value, and when, in addition, a lateral vehicle acceleration exceeds a defined second threshold value.

10. A method of controlling a transfer clutch of an at least temporarily four-wheel-driven motor vehicle in which the transfer clutch is utilized to distribute a drive torque between primary drive wheels permanently connected with a drive unit of the motor vehicle and to secondary drive wheels optionally connected with the drive unit of the motor vehicle as required, the method comprising the acts of:

- determining a rear wheel slip of the rear wheels of the vehicle;
- determining a front wheel slip of the front wheels of the vehicle;
- determining whether a rear wheel slip of a rear wheel exceeds a front wheel slip of a front wheel on the same side of the vehicle by a value greater than a defined first threshold value; and
- closing the transfer clutch when both (i) the rear wheel slip of the rear wheel exceeds the front wheel slip of the front wheel on the same side of the vehicle by the value greater than the defined first threshold value, and (ii) a longitudinal vehicle deceleration exceeds a defined second threshold value.

11. The method according to claim 10, further comprising the act of closing the transfer clutch when, in addition, a lateral vehicle acceleration exceeds a given third threshold.

12. The method according to claim 10, wherein the act of closing the transfer clutch further comprises closing the transfer clutch during a braking operation outside an antilock control range.

* * * * *